US008611931B2

(12) United States Patent
Lin et al.

(10) Patent No.: US 8,611,931 B2
(45) Date of Patent: Dec. 17, 2013

(54) METHOD AND SYSTEM FOR INTEGRATED CONSUMER EXPERIENCE AND SOCIAL NETWORKING

(76) Inventors: Lang Lin, Potomac, MD (US); Wang Su, East Patchogue, NY (US)

( * ) Notice: Subject to any disclaimer, the term of this patent is extended or adjusted under 35 U.S.C. 154(b) by 0 days.

(21) Appl. No.: 13/506,264

(22) Filed: Apr. 9, 2012

(65) Prior Publication Data

US 2013/0267250 A1    Oct. 10, 2013

(51) Int. Cl.
*H04W 24/00* (2009.01)
(52) U.S. Cl.
USPC ...................................... 455/456.3
(58) Field of Classification Search
USPC .......... 715/716, 727, 863, 811, 702; 345/661, 345/156, 158, 428, 147, 442; 382/195; 348/14.12, 14.02, 42, 739; 455/566
See application file for complete search history.

(56) References Cited

U.S. PATENT DOCUMENTS

| | | | |
|---|---|---|---|
| 5,813,008 A | 9/1998 | Benson | |
| 6,389,433 B1 | 5/2002 | Bolosky | |
| 6,477,544 B1 | 11/2002 | Bolosky | |
| 7,180,500 B2 | 2/2007 | Marvit | |
| 7,180,501 B2 | 2/2007 | Marvit | |
| 7,301,526 B2 | 11/2007 | Marvit | |
| 7,426,637 B2 | 9/2008 | Risan et al. | |
| 7,483,958 B1 | 1/2009 | Elabbady | |
| 7,664,124 B2 | 2/2010 | Alston et al. | |
| 7,769,641 B2 | 8/2010 | Jouret et al. | |
| 7,783,767 B2 | 8/2010 | Collazo | |
| 2009/0259967 A1* | 10/2009 | Davidson et al. | 715/799 |
| 2012/0007826 A1* | 1/2012 | Zheng | 345/174 |

OTHER PUBLICATIONS

U.S. Appl. No. 12/252,322, filed Oct. 22, 2009, Sachs; David.
U.S. Appl. No. 11/753,024, filed Sep. 27, 2007, Strickland; Mark.
U.S. Appl. No. 11/366,341, filed Sep. 20, 2007, Wu; Chi Kong.
U.S. Appl. No. 12/411,592, filed Sep. 30, 2010, Kittel; Armin W.
U.S. Appl. No. 12/456,582, filed Dec. 31, 2009, Rizal; Dharmarus.
U.S. Appl. No. 12/146,839, filed Jan. 15, 2009, Garofalo; Michael.

* cited by examiner

*Primary Examiner* — Kiet Doan

(57) ABSTRACT

Methods and systems for integrated consumer experience and social networking are disclosed comprising the function of presenting a communication function to facilitate communication among multiple users wherein different modes of communication are achieved through a unified process utilizing a context information. The methods and systems further comprise the functions of causing two images to be displayed wherein the two images overlap with each other, and presenting a logic to determine which one of the two images a gesture control signal is directed to. Additionally, the methods and systems can also comprise the functions of receiving a location information of a first device, receiving a location information of a second device, receiving a distance limitation from the first device, determining if the second device is within the distance limitation, and delivering a message from the first device to the second device if the second device is within the distance limitation.

16 Claims, 8 Drawing Sheets

METHOD AND SYSTEM FOR INTEGRATED CONSUMER EXPERIENCE AND SOCIAL NETWORKING

BACKGROUND OF THE INVENTION

Modern mobile devices such as smartphones and tablet computers incorporate ever increasing computing power. Smartphones using dual core microprocessors are becoming more and more common. Some smartphone can even be used as a laptop computer with the addition of a docking station. This ever increasing computing power means more and more applications can be run on a single mobile device. When there are a lot of applications installed on a single mobile device, to search for a particular application could be very time consuming and lead to user inconvenience. Often times, due to the limited display area of a mobile device, the numerous applications would have to be spread out over multiple screens, which makes locating a particular application even more difficult.

Moreover, many people use communication networks such as internet, cellular networks, and cable networks to communicate with one another. The different methods of communication include internet based social network such as Facebook or Google+, location based social network such as Color, micro blog such as Twitter, email, instant messaging, public forum, etc. People can also use communication network to share digital contents such as photos, videos, and electronic books, or form groups to buy goods at a discount, such as Groupon. The existing communication methods are mostly designed to serve one primary purpose. For example, Facebook, Color are mostly designed to provide social network service, Yahoo Mail or Gmail is designed to provide primarily email services, Groupon is a dedicated shopping service. These different dedicated services are managed by different companies, therefore they require users to set up different accounts for each of these different services. Each account requires a separate account name and password. Users of these services will need to manage multiple different accounts and multiple different passwords, which can become really inconvenient. Additionally, users will have to log into all these different accounts separately to use these services, which would limit the capability to interchange information between these services. These different communication functions are also often represented by different applications mingled with many other applications on the user's computing devices, which makes locating all these separate applications a time consuming task.

Lastly, rapid advance in technology brought vastly improved new functions to computing devices including mobile devices. For example new smartphones such as iPhone and Android enabled smartphones make touch screen technology a common feature. Motion sensors embedded in these smartphones such as accelerometer and gyro sensors have enabled gesture control technology on these devices. None of these new functions was common on traditional desktop computers. Modern smartphones also have digital cameras and digital video camcorders integrated into the phones directly, changing the traditional method of taking a photo with a standalone camera, taking a video with a video camcorder, and making a phone call with a standalone phone. These new features and new functionalities of the modern communication devices open the opportunity for new ways of operation to improve user experience.

Therefore, there is a need for an integrated and multifunctional media processing and communication method that provides a unique method of operation, integrates the different communication functions, and better utilizes the advance features on modern communication devices to both simplify and enhance user experience.

DETAILED DESCRIPTION OF POSSIBLE EMBODIMENTS OF THE INVENTION

Figure 1:
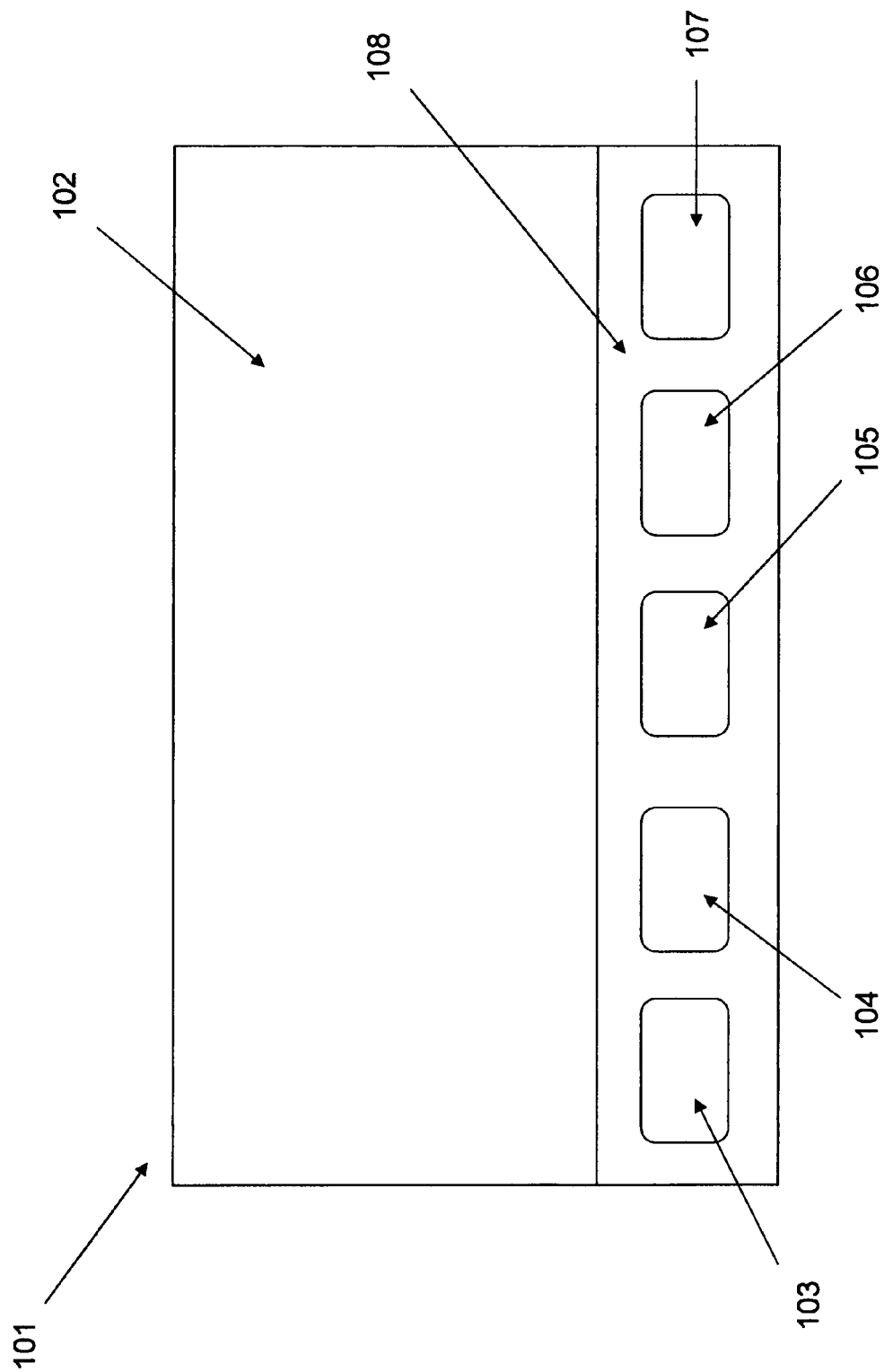
FIG. 1 is an illustrative view of the user interface of one embodiment of the invention.

Possible embodiments of the invention are discussed in this section.

Modern mobile communication devices are computing powerhouses. Their operating systems are designed to run multiple applications. Recently, the number of applications available for the Android operating system enabled mobile devices exceeded four hundred thousand. On the other hand, the number of applications available for iPhones exceeded five hundred thousand. These numbers are rapidly increasing by each day. The emergence of applications on mobile devices has fundamentally transformed mobile devices. Phones are no longer one dimensional voice communication devices. The modern smartphones and other mobile devices such as tablet computers are multimedia multifunctional devices having applications ranging from phone, to camera, to email, to web browsing, to shopping and many more. Each of these different applications is typically represented as an icon on a display of the smartphone. Because users of modern mobile devices have access to hundreds of thousands of applications, many of them are free, it is not uncommon for each user to install dozens, if not hundreds of applications on her mobile device. Many mobile devices, such as smartphones, have a display that is about four inches in diameter, or smaller. This means that the number of icons can be shown on the display at the same time is limited, and icons for different applications many have to be spread out to different screens. To navigate through the different screens takes time. If the application is time sensitive, spending the time to navigate through multiple screens to locate the application could cause the loss of good opportunities. For example, the camera application could be mixed with dozens of other applications. When there is a fleeting moment of interest, the user could miss it because of the time required to locate the camera application from dozens of other applications. Additionally, among the dozens or hundreds of applications installed, the user may be spending the vast majority of her time with the features represented by only a few of these applications.

According to one embodiment of the invention, multiple diverse and advanced features are seamlessly combined into one overarching application which would vastly improve user convenience and user experience. This overarching application integrates numerous diverse sub-functions which are most commonly used by the user, such as camera and video, web browser, digital media reader, social network, gaming, and shopping. The overarching application is downloadable from an external application store and can preferable run on different operating systems such as Android, iOS, and Windows. The specific sub-functions integrated into the overarching application can be customized by the user. For example, if the user hardly uses the media reader but checks news very often, the user can substitute the media reader sub-function with a news reporter sub-function. If the user does not play game very often, she can remove the gaming sub-function from the overarching application. If the user listens to radio very often, he or she can add the radio sub-function to the overarching application. After the customization by the individual user, the overarching application would include a set of sub-functions that the user uses for the vast majority of the time with the particular computing device that the overarching application is installed on.

According to one embodiment of the present invention, the overarching application acts like a cabinet. A user can simply drag and drop an application representing a sub-function into the overarching application, or remove a sub-function from a overarching application by removing an icon representing such sub-function from the overarching application. By such drag and drop or removal, a program link is formed or disconnected between the overarching application and the sub-functions. However, the overarching application according to this embodiment is not a mere aggregation of sub-functions. It creates an unique user interface for the sub-functions so that they are displayed in an integrated manner. It also defines a relationship between the sub-functions. For example, it can define the order of sequence by which the sub-functions are to be activated and become foreground application once the overarching application is activated. The relationship may be kept available in a database associated with the overarching application. It may also include a decision logic to arbitrate the computer resources to be dedicated to each sub-function. For example, the overarching application allocates the vast majority of computer resources including CPU time and memory to a currently active sub-function, allocates a smaller portion of computer resources to a sub-function running in the background, and changes the allocation dynamically depending on the amount of usage by the user of the various sub-functions. When a sub-function is removed from the overarching application, the decision logic may mark the sub-function as an un-chosen sub-function and forbid the sub-function from occupying any CPU time. Alternatively, when a sub-function is added to the overarching application, the decision logic may load the sub-function into the memory and let it occupy CPU time occasionally. In this way, the sub-function can start performing its tasks quickly if needed.

FIG. 1 is an illustrative view of the user interface of one embodiment of the invention. According to this embodiment, once the overarching application is activated, the application divides the display 101 into two basic areas, an application internal display area 102 and a sub-function set area 108. The application internal display area 102 serves to display images, videos, or texts of a sub-function or multiple sub-functions being run at a particular time. The sub-function set area 108 displays the multiple sub-functions integrated into this overarching application. These sub-functions can be displayed as individual icons such as icons 103, 104, 105, 106, and 107. Each individual icon represents an individual sub-function such as camera, web browser, etc. Users can customize the sub-function set by adding, removing, or substituting icons displayed in the sub-function set area 108.

When user wants to use one of these sub-functions, she can do so by tapping one of the icons displayed in the sub-function set area 108, and the activated sub-function will use the application internal display area 102 as the display. When the user wishes to close the sub-function, she can simply tap the same icon again. Besides using icon-tapping to open or close a sub-function, it is also possible to use gesture control to achieve the same result. According to one embodiment, a user may put one of her fingers on the touch screen of her mobile device and make a turn of certain degrees along any axle of the mobile device (for example more than 30 degrees). Upon detection of such gesture, the over-arching application may close or open a sub-function, or rotate between adjacent sub-functions. For example, a user can decide the sequence of the sub-functions. A gesture can then be used to switch an application to the next application in the sequence. The benefit of this design is that there is now no need to have icons of the sub-functions shown on the display. The internal display area 102 can occupy the entire display occasionally when there is no need to see the icons for the sub-functions.

Multiple sub-functions can be running at the same time. When multiple sub-functions are active at the same time, they can share different regions of the internal display area 102, or one sub-function can be running at the foreground and some of the other sub-functions are running at the background. The sub-functions that are active could be indicated by visual indications such as showing a running sign next the icons corresponding to the active flub-functions displayed in the sub-function set area 108. The active sub-functions could also be indicated by statically or dynamically changing the color of their corresponding icons. When the sub-functions are deactivated, or closed, the running signs would disappear, or the color of the icons would revert back to their normal colors. When a sub-function is running at the background, it can partially overlay its image over the image of the sub-function running at the foreground. The overlay could cover the entire internal display area 102, or a portion of the internal display area 102. For example, the user could activate web browser and camera sub-functions at the same time. Web browser is running at the foreground and the camera is running at the background. Visual indications are added to the two icons corresponding to these two sub-functions to indicate that these two sub-functions are running. The web browser sub-function takes up the entire internal display area 102, so that the user can use this entire area to browse interne. The camera sub-function, since it is active, can show a preview image or video by overlaying an image over the web browser image. The overlaying image could take up just a small area of the web browser image, so that it would not interfere with the user's web browsing experience, and gives the user a preview of the camera image at the same time. If the user finds a scene that she likes, she can quickly trigger the photo taking since the camera sub-function is already actively running in the back ground, without closing or exiting the web page she is browsing. The photo that is taken could be shown over the entire display for a brief moment to allow the user to view the photo taken at a larger size, and then recedes to allow the browser image to be shown again, so that the user can seamless go back to her web browsing experience.

A computer system typically consists of central processing unit (CPU), memory, storage, USB, audio, input devices, communications modems, etc. A mobile device is often a computer system with a display, which is often a touch sensitive screen that also acts an input device. Sometimes, in a mobile device, the CPU and many peripherals are package in a system on a chip (SoC), such as A5 from Apple and Tegra from NVIDIA. Beyond the hardware component, operating systems (OS) for computer systems, including mobile devices, provide applications with a set of common interfaces for accessing/sharing the hardware resources, e.g. CPU, memory, hard drive, video cards, display, etc.

For a mobile computing platform, such as a smart phone, one of the most limited and yet demanded resource is the display. The diameter of a display on a smart phone is typically around 4 inches. The diameter of a display on a tablet computer is typically around 7 to 10 inches. This kind of display can easily be occupied by a single application. Additionally, touch screen devices often use display as the input device, including showing a virtual keyboard. Virtual keyboard could take up a significant portion of the display, making the display area even more scarce. Specific schemes can be designed to maximum the utilization of the display. For example, a foreground application may occupy the vastly majority of the display area, a background application may occupy a small portion of the display occasionally or constantly, or occupy a fairly large amount of the display, or even the entire display area, either for a short time period in the range of a few seconds, or for a longer time period but overlaying on top of the foreground application image to allow the foreground application to be seen as well.

According to one embodiment of the present invention, two separate applications, such as two sub-functions, are allowed to share significant portions of the display at the same time by overlaying one image on top of another. For instance, the user may compose a text message and review a picture at the same time. The text message may be a comment to the picture. Both the text message and the picture are displayed over a significant large portion of the display, or over the entire display. The text message and the picture overlapping each other. There are different ways to achieve this effect. The display contents may be loaded to an overlay plane for computing devices supporting OpenGL, or use the alpha blending method. Alpha blending is a commonly used imaging processing method for the purpose of combing multiple layers of image frames with various degrees of opacity. Each pixel on the display is fed with the image information from two separate applications, and a weight is applied to determine the relative prominence of the images from the two separate applications. The weight in this case is a factor introduced in the Alpha blending formula. It can be changed by the user to increase or decrease the prominence of one image versus another when they are displayed together overlapping each other. Another method to overlay more than one images on the same display area is to display pixels from the images of different applications alternatively. For example when displaying two overlapping images on the same display area, all the even number pixels of image A are displayed and odd number pixels of image A are omitted while all the even number pixels of image B are omitted and odd number pixels of image B are displayed. The weight between image A and image B can be changed by increasing the number of displayed pixels of one image and decrease the number of displayed pixels of another image. The above described methods can be used to display images from more than two applications at the same time. For example, a user may compose a text message, review a picture, and draw lines across the display at the same time. In this example, the user may be running three applications at the same time: text editing application, photo review application, and drawing application. Each application produces its own image, and all three sets of images from the three application are displayed on significant portions of the same display at the same time, overlapping each other with the method introduced above. Even more applications can be introduced at the same time to share the same display.

According the one embodiment of the present invention, two applications, for example two sub-functions of an overarching application, are active at the same time. One runs in the foreground and the other runs in the background. The images from these two applications occupy all or a large majority of the display at the same time, overlapping with each other according to the method introduced above.

When the images from two or more applications are overlapping, a configuration procedure is incorporated to adjust the images of the various applications. One implementation of the procedure is to allow a user to directly adjust the alpha values corresponding to the images of the various applications. When there are only two applications, instead of adjusting two alpha values, the ratio of the two alpha values can be adjusted as a more simplified approach. Other display parameters such as contrast, bright, hue, font size, font type can be adjusted as well for each of the overlapping images.

A logic is applied to interpret and process the inputs directed to the overlapping images on the touch screen. The logic determines which one of the two overlapping images the input is directed to, and the application connected to such image is then chosen to process such input. More applications and more layers of overlapping images can be processed sharing the same display area according to the present invention.

Figure 2:
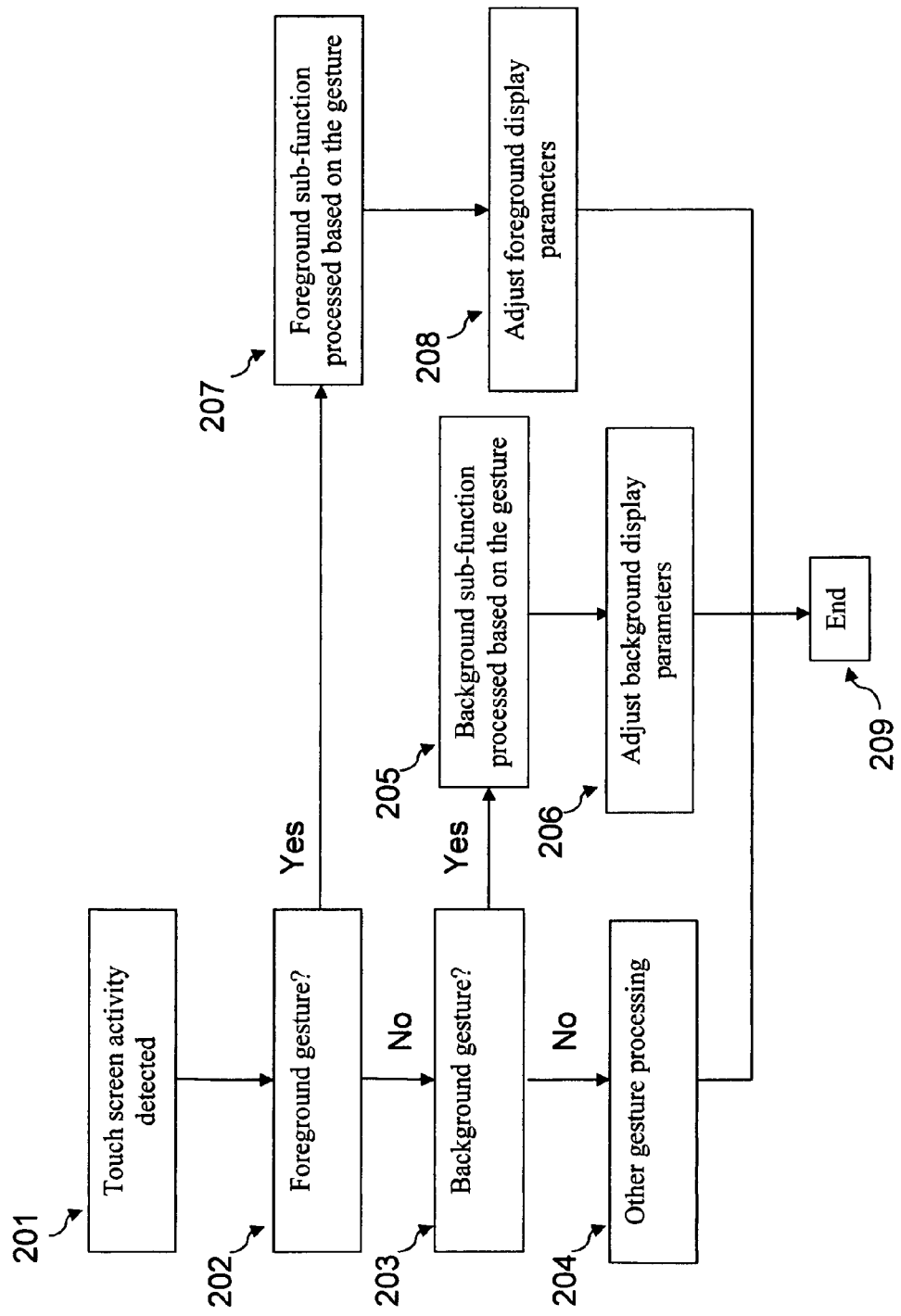
FIG. 2 is a flow chart showing illustrative steps that may be followed to perform the multilayer control function according to one embodiment of the invention.

FIG. 2 is a flow chart showing illustrative steps that may be followed to perform the multilayer control function according to one embodiment of the invention. At step 201, the display, which is touch sensitive, receives a touch signal which can be interpreted as a gesture control signal, for example two finger tips moving away from each other or a typing signal by a finger tip. At Step 202, a logic determines if there are two applications running at the same time, and if so, which one is running at the foreground and which one is running at the background. The logic also receives information relating to the nature of the two applications and make a determination with respect to which one of the two applications the gesture control signal should be directed to based on the nature of the two application and the nature of the gesture control signal. For example if the two active applications consist a photo display application and a virtual keyboard, then the gesture of two finger tips moving away from each other which is interpreted as an enlarge instruction would be directed to the photo display application because the nature of the control signal matches better with the nature of the photo display application. On the other hand, the typing signal by a finger tip would be directed to the virtual keyboard application, because their natures match better with each other.

According to one embodiment of the present invention, each application may have a set of gesture control signals defined as relevant to such application. In addition to such relevancy information, a strength indicator may also be assigned to each gesture control signal in relation to each relevant application. For example, application A may have three gesture control signals defined as relevant to application A. Application A will only respond to these three gesture control signals. Each of these three gesture control signals has a strength indicator with respect to application A. The strength indicator reflects how strongly such gesture control signal is related to application A. Application B may have four gesture control signals defined as relevant to application B. Application B will only respond to these four gesture control signals. Each of these four gesture control signals has a strength indicator with respect to application B. The strength indicator reflects how strongly such gesture control signal is related to application B. The gesture control signals defined as relevant to application A could be the same as the gesture control signal defined as relevant to application B, but they can also be different. Such relevance information and strength indicator are stored and are accessible by the computing device. At step 202 if a logic receives a gesture control signal when application A and application B are both running at the same time, the logic can check relevance information for application A and application B to see if the gesture control signal is relevant to either one of the two applications. If it is relevant to only one of them, then the logic will direct the gesture control signal to that relevant application. If it is relevant to both of them, then the logic will check the strength indicator of this gesture control signal with respect to each of these two applications and direct the gesture control signal to the application with a stronger strength indicator. If the strength indicators for the two applications are the same, then the logic can direct the gesture control signal to one of the applications based on context information. For example, if the previous gesture control signal was directed to application A, then the logic will direct this gesture control signal to application A as well assuming that the user is more likely to be operating on the same application. According to another embodiment of the present invention, a control component such as a button, or some special gesture control signals can be employed to determine a certain gesture control signal shall be directed to which application. A user can use the control component or the special gesture control signals to switched between the applications that would receive the gesture control signal. This manual method could be used independently. It could also be used in connection with the automatic logic introduced above, either when the logic runs into some difficulties in determining which application the gesture control signal should be directed to, or when the user wants to override and change the logic's decision.

If at step 202 the logic decides to direct the gesture control signal to the foreground sub-function, then at steps 207 and 208 the foreground sub-function is processed based on the gesture signal and the foreground display parameters are adjusted. The foreground image may be made more prominent as a result of the display parameter adjustment. The display parameter adjustment may be done by changing the weight of the overlapping displayed images as introduced above. If at step 203 the logic decides to direct the gesture control signal to the background sub-function, then at steps 205 and 206 the background sub-function is processed based on the gesture signal and the background display parameters are adjusted. The background image may be made more prominent as a result of the display parameter adjustment. If the logic decides at step 203 that the gesture control signal is not related to the background sub-function, then at step 204 the logic decides whether the gesture signal is related to other processing. The decision process is complete at step 209.

Figure 3:
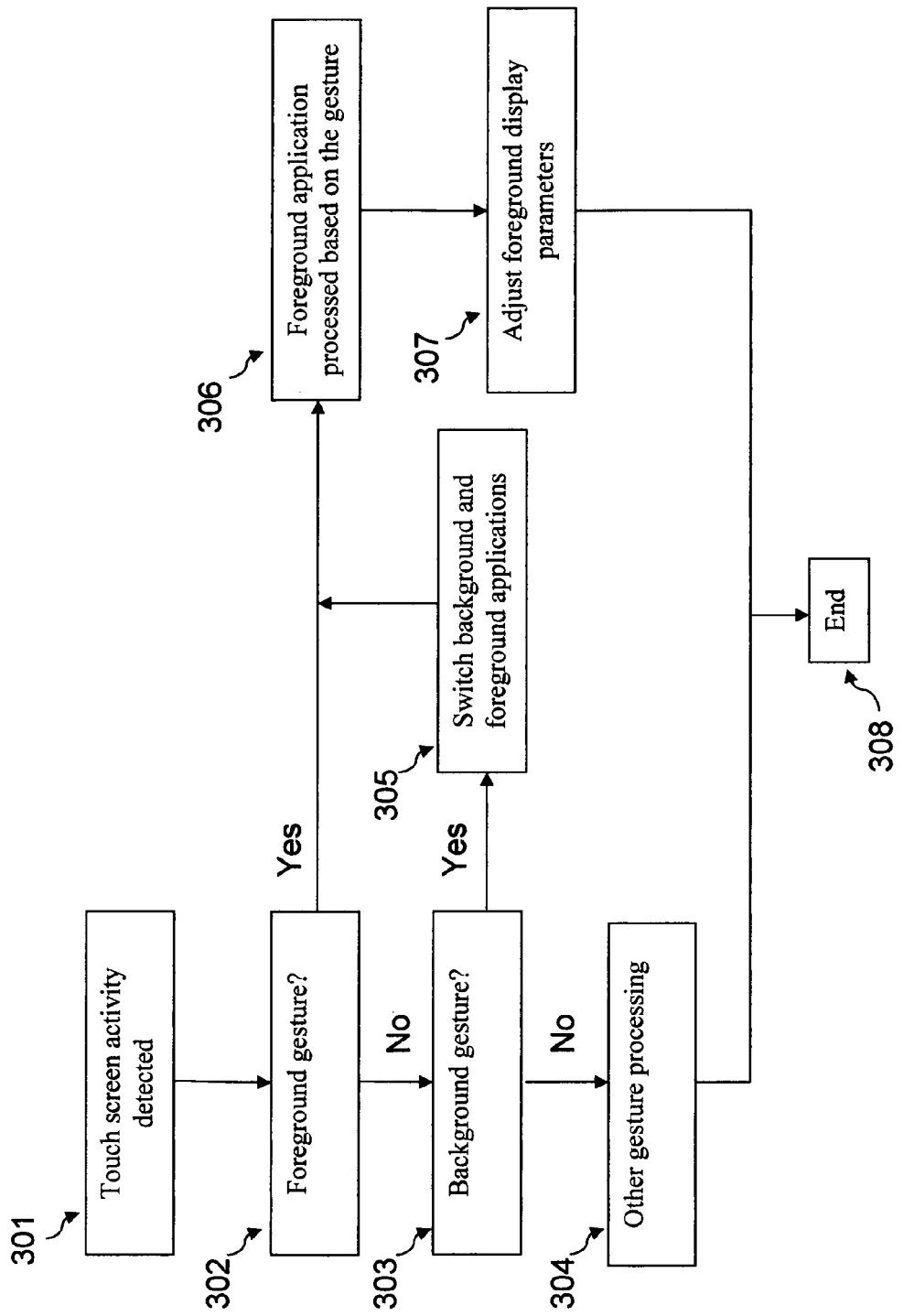
FIG. 3 is a flow chart showing illustrative steps that may be followed to perform the multilayer control function according to one other embodiment of the invention.

FIG. 3 is a flow chart showing illustrative steps that may be followed to perform the multilayer control function according to one other embodiment of the invention. At step 301, the display which is touch sensitive detects a touch signal which is interpreted as a gesture control signal. At step 302 a logic decides whether there are two applications running at the same time, and if so whether the gesture control signal is directed to the foreground applications. If the answer is yes, then at steps 306 and 307 the foreground application is processed based on the gesture signal and the foreground display parameters are adjusted. If the answer is no, then at step 303 the logic decides if the gesture signal shall be directed to the background application. If the answer is yes, the at step 305, the background application is changed to foreground application and the foreground application is changed to background application. The background application and foreground application switch can be achieved by adjusting the distribution of system resource between the two applications. System resource may include CPU time and memory. More system resource would be allocated to the foreground application and less system resource would be allocated to the background application. If the logic decides at step 303 that the gesture control signal is not related to the background application, then at step 304 the logic decides whether the gesture signal is related to other processing. The decision process is complete at step 308.

When multiple images from multiple applications are being displayed at the same time overlapping each other, the user may decide which application should be the relevant application and direct all subsequent touch screen inputs to that application. The selection of the relevant application could be done by key input, voice command, or gesture control. According to one embodiment of the present invention, the user touches the touch screen according to a predefined gesture, such as double tap or drawing a circle. The area of the display impacted by the touch gesture is considered an area of interest. The computing device takes a portion of the image shown in the area of interest impacted by the touch gesture from each of the multiple overlapping images. Those portions of images associated with those overlapping images are analyzed and one of them is selected according to certain criteria. For example, the criteria could be color variation, e.g. which one has the most color variations, or contrast variations, e.g. which one has the most contrast variations, or border transition, e.g. which one has the most border transitions, or a mixture of the above. The criteria can be predetermined or can be set by the user. Once a particular portion of image is selected after the analysis, the corresponding application associated with this image is then determined to be the relevant application. The subsequent controls including gesture controls or key inputs are then directed to this application until another defined incident occurs. The defined incident could be a control that selects another application as the relevant application. Such control could be the same key input, voice command, or gesture control as discussed above.

The multiple overlapping images as discussed above could each has a border, and these boarders could have slight shifts in positions relevant to each other so as to distinguish between these overlapping images. The computing device could also add a different color hue to each of these overlapping images to distinguish them from each other.

Figure 4:
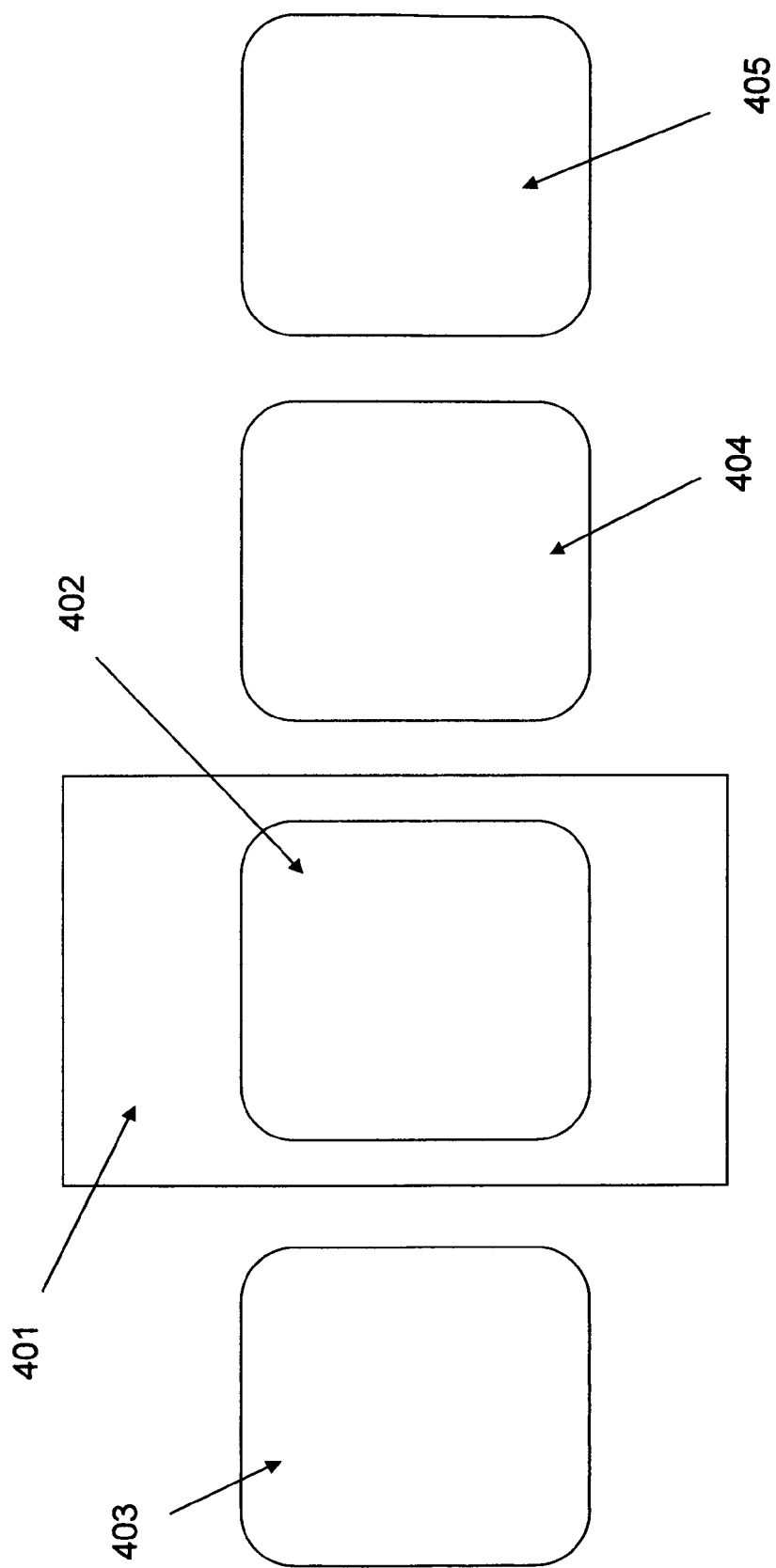
FIG. 4 is an illustrative view of the user interface of another embodiment of the invention.

FIG. 4 is an illustrative view of the user interface of another embodiment of the invention. According to this embodiment, an overarching application incorporates multiple sub-functions such as sub-functions 402, 403, 404, and 405. Each of these sub-functions when activated, would occupy the vast majority or the entire display area of a display such as display 401. The other sub-functions not selected will not be shown. This embodiment gives the selected sub-function the most display area. The user can navigate between the different sub-functions by making certain gestures. Because most modern mobile devices have motion sensors, such as accelerometer and gyro sensors, they can sense and interpret motions. The mobile device can then execute certain controls based on the motion. For example, according to one embodiment of the present invention, if the user makes a clockwise circular motion with the mobile device, the current running sub-function 402 will be closed and the next sub-function 404 will be activated and shown on display 401. If the user makes a counterclockwise motion with the mobile device, the current running sub-function 402 will be closed and the previous sub-function 403 will be activated and shown on display 401. According this embodiment of the present invention, a user can easily navigate through multiple sub-functions incorporated into one overarching application by making certain simple gestures, and each activated sub-function will be able to use the vast majority or the entire area of display 401. Other gestures can be used to navigate through the sub-functions as well. Mobile devices can also be used to learn gestures from the user so that the user can use her own customized gestures to navigate through the different sub-functions incorporated in the overarching application easily and quickly. Other control methods can also be used to navigate through the sub-functions, such as using touch screen by sweeping a finger across a touch screen. According to another embodiment of the present invention, the active sub-function occupies the entire or vast majority of display 401. The other sub-functions are also shown on display 401 as relatively small icons overlaying the image of the active sub-function.

Figure 5:
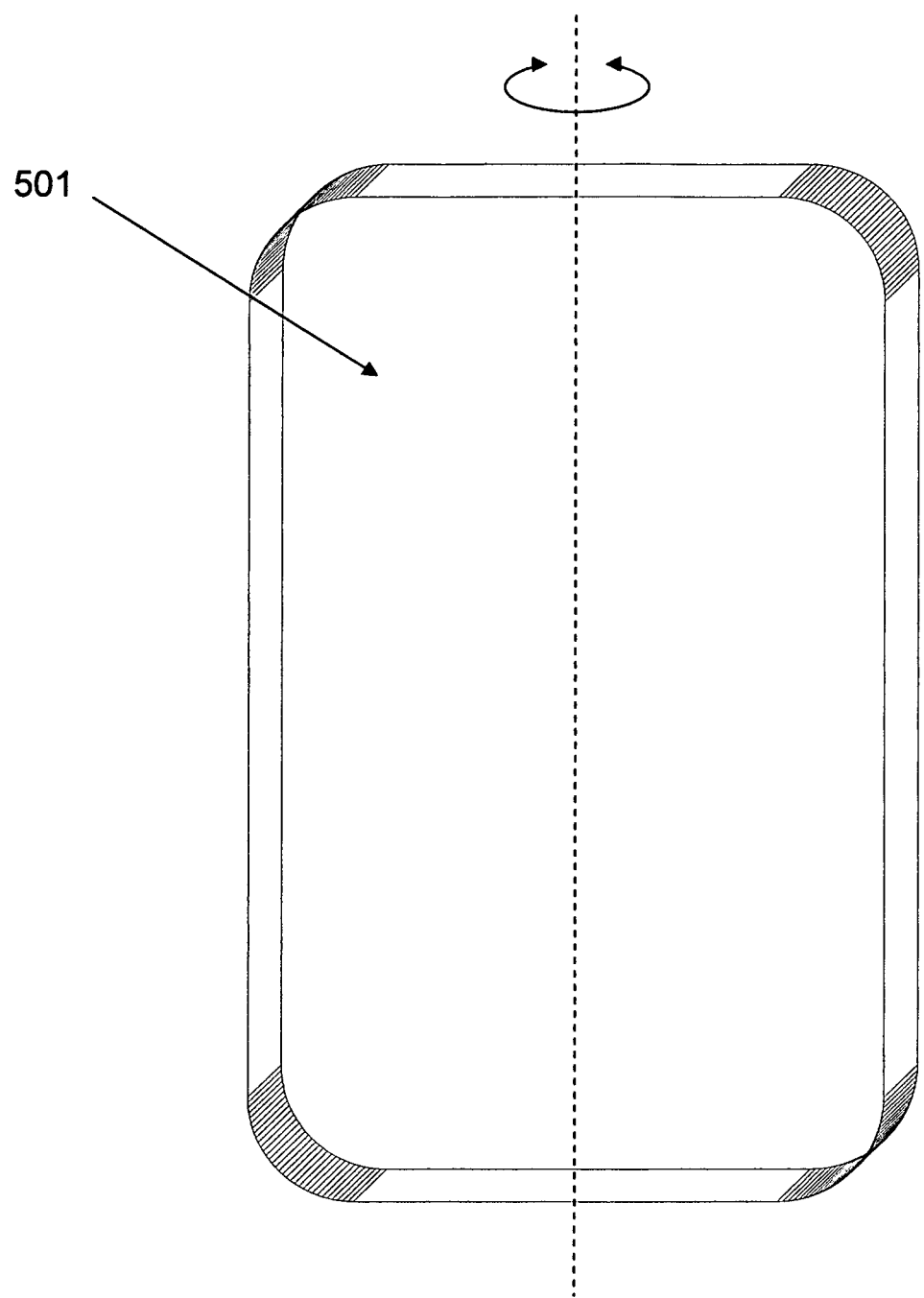
FIG. 5 is a perspective view showing a mobile device being operated according to one embodiment of the invention.

Individual sub-functions within the overarching application can be operated with gesture control. FIG. 5 is a perspective view showing a mobile device being operated according to one embodiment of the invention. For example, the camera sub-function is now activated on mobile device 501. The camera sub-function is active but it is not taking photos, it may be showing a photo preview and is in a standby condition ready to take photo at any moment. When the user sees a good moment, she can trigger the camera sub-function to take a photo by making a quick gesture such as rotating the mobile device 501 along its central axis more than thirty degrees clockwise or counterclockwise. The mobile device 501, after sensing the rotation motion with its motion sensors, can wait a brief moment to allow the mobile device 501 to stabilize and then triggers the camera to take a photo. Other gestures including user customized gestures could be used to achieve the same purpose.

Figure 6:
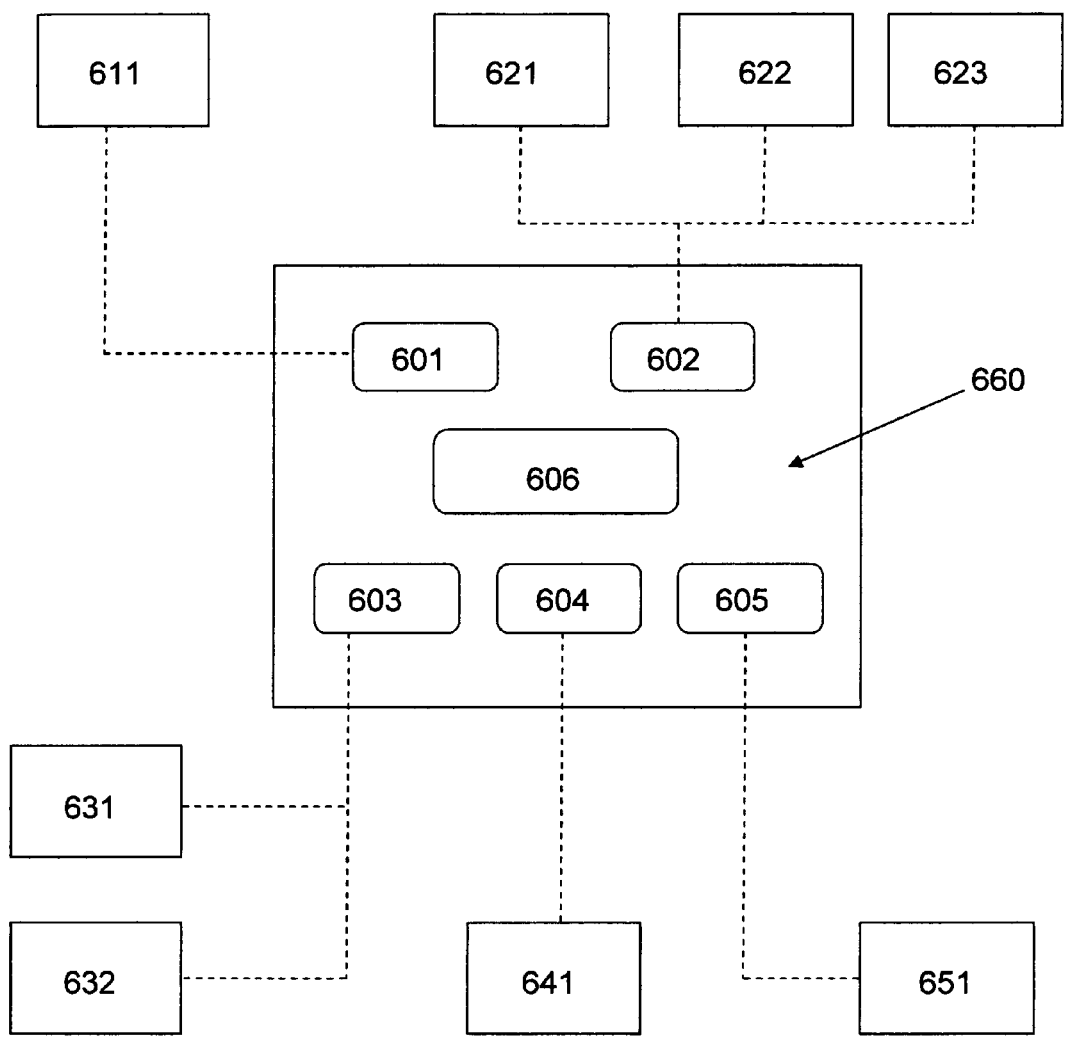
FIG. 6 is a schematic diagram showing an illustrative system of one embodiment of the invention.

One of the sub-functions within the overarching application may be a communication sub-function. This sub-function, like the other sub-functions mentioned above, could also be an independent function outside of the overarching application. According to one embodiment of the present invention, multiple diverse modes of communication, such as social network, email, instant message, public online forum, and Twitter are seamlessly combined into one comprehensive communication sub-function. FIG. 6 is a schematic diagram showing an illustrative system of one embodiment of the invention. According to one embodiment, multiple users communicate with each other through a central communication unit 660 such as a server or a public switch. Central communication unit 660 has storage areas such as 601, 602, 603, 604, 605, and 606. Storage areas 601, 602, 603, 604, and 605 are reserved for individual users with respective account names. Users communicate with central communication unit 660 and access the storage areas on central communication unit 660 through communication devices. Communications devices 611, 621, 622, 623, 631, 632, 641, and 651 may be mobile devices such as smartphones and tablet computers. They may also be other communication devices such as desktop or laptop computers. A user may own multiple different communication devices and communicate with central communication unit 660 through multiple different communication devices. Storage area 606 is used as a public storage space not dedicated to any particular user.

A user uses a communication device to communication with another user with a communication device through the central communication unit 660. The user devices are connected with central communication unit 660 through the available communication networks, such as interne carried by cable or WiFi networks, or wide area wireless networks such as LTE, WiMax networks. Each user, upon registration, receives an account name and is assigned a storage area on central communication unit 660. The account name identifies the user. The assigned storage area is reserved for the account name. The user stores her personal data, such as email message, posts, photos, videos in this area. The user can also choose to make the information in this storage area available to a selected group of persons, allowing them access to data stored in this area and allowing them to post information, such as comments in this storage area. A communication device such as communication device 611 may have a display to display contents it sends to or receives from the central communication unit 660. A user may own multiple communication devices such as 621, 622, and 623, and only one reserved storage area on central communication unit 660, such as 602. The user's personal data may be saved in the storage area 602, and can be accessed and displayed with any one of the multiple communication devices 621, 622, and 623. Public storage area 606 may be accessed by any user through any communication device connected to the central communication unit 660. The central communication unit 660 and the communication devices also comprise microprocessor and software to control the communication feature.

According to one embodiment of the present invention, when a user initiates a communication session, she can initiate different modes of communication without the traditional boundaries of those different modes of communication. User is no longer required to go into different applications to send an email, send an instant message, post a micro blog such as Twitter message, initiate a post on a public forum, or respond to a post on a social network page. Instead, the user can do all of these seamlessly with one unified communication application as provided by the present invention. The unified communication method carries all these different modes of communication with one streamlined method. The unified communication application presents a user interface where a user can access multiple different modes of communication at the same time. These different modes of communication are represented by text, icon, or a particular screen area. Such text, icon, or screen areas form part of context information. Once a user selects the text, icon, or a particular screen area, a certain mode of communication can then be selected by the unified communication application and carried out according to the present invention.

The unified communication application uses the same streamlined method to process multiple modes of communication. The unified communication application receives content information and context information from the communication device controlled by a user. The content information is what the user wants to be communicated. It can be a text message, a document, a picture, or a video. The context information indicates the context under which the user presents the content information. It could be information that a user just selected a text, icon, or a particular screen area. It could be other context information. For example, the user may have just clicked on a wall post and then presented the content information, the context information in this scenario is that the user just clicked a wall post and the details about the wall post. The user may have just clicked a text which indicates another user's name. The context information in this scenario is that the user just clicked a text and the content of the text. The user may have just clicked a tag or an icon on a screen and the tag or icon links to a public forum or a specific area in a public forum, The context information in this scenario is that the user just clicked a tag or an icon and the link connected to the tag or the icon.

After receiving the content information and the context information, the unified communication method stores the content information in a storage area associated with the central communication unit 660. The unified communication method makes a determination on where the content information is stored based at least partially on the context information. For example, if the context information is that the user just clicked a text and the content of the text indicates the name of another user, then the content information may be stored in one or both of the two storage areas associated with these two users. If the context information is that the user just clicked a wall post and the details about the wall post, then the content information may be stored in a store area associated with that particular wall post. If the context information is that the user just clicked a tag or an icon and the tag or the icon are linked to a public forum, then the content information may be saved in a storage areas associated with the public forum. After storing the content information, the unified communication device generates a pointer. The pointer points to a location of the content information in the storage. This pointer is similar to the reference pointer used in the single instance storage method. Based on the context information, the unified communication method may associate the pointer with a particular post on a wall, a particular place in a public forum, a particular end user, or a particular group of end users. Once the association is established, the unified communication method would send the pointer to a destination address based on the association and/or the context information. For example, if the pointer is associated with a particular post on a wall, then the pointer may be sent to a destination address where information related to the wall is stored. If the pointer is associated with a public forum, then the pointer may be sent to a destination address where information related to the public forum is stored. If the pointer is associated with an end user or a group of end users, then the pointer may be sent to that end user or that particular group of end users. Content information or pointers associated with a wall or with a public forum may be accessed by everyone or by just a limited group of users. The context information associated with the content information may set a limit on who can access the content information. Such limit can be set by the user who provides the content information. In the case of wall posts and public forum, the content information or the pointer may be stored at a proper position associated with the wall or within the public forum, and is access by a user at the user's choice if the user has access right to it as determined by the content provider. Social network communication mode and public forum communication mode are effectively achieved by these steps. In the case of destination address being a particular user or a particular group of users, the pointer may be sent to a communication device registered by the user, or a group of communication devices registered by a group of users. Upon receiving the pointer information, the particular user or group of users can then access the content information through the pointer. Recipient users can respond to these contents by providing their own content information in connection with certain context information, such context information could include the information that the user just selected a previous content information to respond. Instant message communication mode, email communication mode, or micro blog communication mode such as Twitter are effectively achieved by these steps. As introduced above, the unified communication application is able to achieve multiple modes of communication through the same streamlined process. This method greatly simplifies system design when multiple communication methods are desired by the same user. It also greatly improves user experience by allowing the user to conduct multiple modes of communication using the same unified communication application.

The above embodiment of the present invention is discussed in the context of using a pointer in connection with a content information. The pointer is used primarily to facilitate the speedy dissemination of information. The reason that it will speed up the dissemination of information is because the pointer file is very small compared to some content files such as image or video. Due to its small size, a pointer file can be easily transmitted to a large group of users even over a wireless network with limited bandwidth. The content file could be stored in a centralize storage associated with the central communication unit 660. Upon receiving the pointer information, the user owned communication device can start downloading the content information based on the information contained in the pointer. This process can begin before the user accesses the pointer to save time. After the user has reviewed the content information, the content information may be deleted from the user owned communication device to save storage space. The user can access the content information through the pointer again is she so desires as long as the pointer is saved by the user owned communication device. According to one embodiment of the present invention, after receiving the pointer information, the user owned communication device downloads a reduce sized sample information based on the original content information, for example a reduce sized picture sample from a picture contained in a original content information, or a reduce sized video. A threshold can be established as to when this step takes place. The threshold can be determined by the size of the content file, the user's data plan, or the storage size of the user owned communication device. After the user has had a chance to review the reduce sized sample information, the user is then given a choice to download the full sized content information. In addition to the methods introduced above, the present invention can also be practiced without using a pointer. In which case the content information would be directly sent in place of the pointer. Users will receive content information directly rather than receive a pointer first and then access the content information through the pointer. Context information will be used much the same way.

One of the advantages of social networking with a mobile device is that the user is likely to have location information because most of the modem mobile devices have built in GPS. A user can send out a probe message not to a particular recipient, but to a group of users within certain distance from her geographical location. The user could also set certain criteria, so that the probe message is sent to users within certain distance froth her geographical location that satisfies the criteria. The criteria could be hobby, areas of interest, trade, age, gender, religion, etc. The probe message is then delivered through a communication network such as a cellular network or WiFi network to a mobile device that is within the geographical limitation if the criteria set by the sender is met. A user can input his or her personal information and save it on a mobile device or a server system. If the information is saved on a server system, it can be linked to a mobile device registered to the same user. The saved information can be accessed by the server system or a mobile device to evaluate if it met certain criteria set by a sender or recipient. User can also set criteria for receiving probe message, so that a probe message will not be delivered to a mobile device even if the mobile device and the user linked with it meets the probe message's criteria. In this case the server system or the recipient's mobile device accesses the sender's information to compare it against the criteria set by the recipient to see if the criteria are met. If a probe message is sent to a mobile device that meets the sender's requirements, and the sender also meets the requirements set by the recipient, a communication can then be established between the sender and the recipient.

According to one embodiment of the present invention, user A wants to know if there is a plumber within ten miles where she is, she can send a probe message asking if there is a plumber to mobile devices within ten miles. The probe message is sent to a central server system. Her GPS location will also be sent to the central server system. The central server system maintains a list of mobile devices, or a list of users with associated mobile devices, that are willing to receive probe messages and provide their GPS locations. The central server system will deliver the probe message to those mobile devices on the list that have a GPS location within ten miles of where user A is. If the user of one of the mobile devices is a plumber or knows a plumber, he or she can respond to the probe message, and a communication link is established. Since user A is likely to receive numerous responses from multiple users, it is preferable that these responses are organized in a group associated with the relevant probe message. According to another embodiment of the present invention, user B wants to know within fifty miles of where he is if there is anyone who is his college alumnus. He only wants to know those alumni who graduated around the same years as he graduated, which means they are within a certain age range closer to his. He can send a probe message asking for alumni to a central server system. The probe message set a criterion that only users within certain age range shall receive the probe message. The central server system also receives his GPS location information, and compare his GPS location with the GPS locations of a list of registered users or mobile devices to select those that are within fifty miles of user B. For those selected mobile devices, the central server system access saved records of the registered users of those mobile devices to find out if there is age information, and if the age is within the range set by user B. If any one of the selected users is within the age range, the central server system will deliver the probe message to that mobile device registered with the user, and a communication link is established. Additionally, the registered users with the central server system could also set criteria for receiving probe messages. For example, user C could indicate that she does not want to receive probe messages from persons under certain age. When the central server system receives a probe message, it checks the age profile of the sender. If it is below the age limit set by user C, the central server system will not deliver the probe message to user C even if all other requirements are met. User C can also send a key word to the central system. The central system searches for the key word in the probe message and delivers the probe message to user C if the key word is found in the message.

Figure 7:
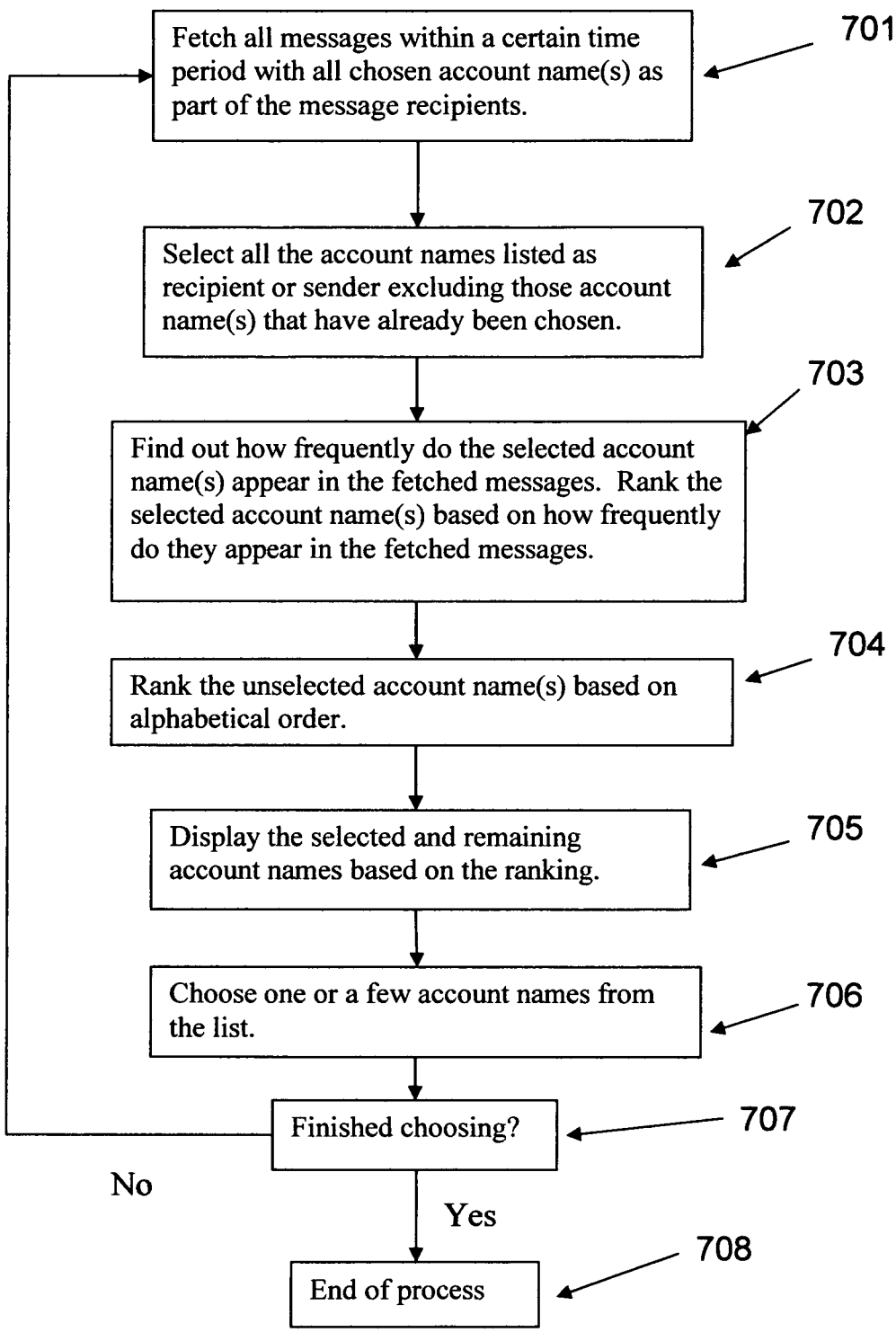
FIG. 7 is a flow chart showing illustrative steps that may be followed to perform the advanced account name ranking function according to one embodiment of the invention.

It is often necessary to select a number of recipient account names from a long list of potential recipient account names when using certain communication methods such as email. FIG. 7 is a flow chart showing illustrative steps that may be followed to perform the advanced account name ranking function according to one embodiment of the invention. According to this embodiment, a user starts with a list of contact account names stored on her communication device. These account names could be represented by icons. The user first picks an account name with whom she wishes to initiate a communication. The chosen account name is placed in a first group, for example the chosen group.

Once an account name is chosen by the user, the communication device selects certain number of account names and ranks them. According to one embodiment of the present invention, at step 701, the communication device fetches all messages of the selected communication method, such as email messages of the email communication method, within a certain time period with the chosen account name as part of the message recipients or senders. The certain time period can be set by the user, such as one month, six months, or a year. For example, the user sets the time period as six month, selects email communication method, and chooses account name Adam. Adam is placed in the chosen group. The communication device would then fetch all email messages received and/or sent by the user within past six months with Adam as one of the recipients or senders. Once these messages are fetched, at step 702, the communication devices can then select all the account names listed as recipients or sender in these fetched messages excluding the account name that has already been chosen. For example, after pulling all the email messages received and/or sent by the user within past six months with Adam as one of the recipients or senders, the communication device selects all the account names listed as recipients or senders in these email messages excluding Adam.

Once the account names are selected, at step 703, the communication device finds out how frequently do the selected account names appear in the lists of senders and recipients of the fetched messages, and rank the selected account names based on how frequently they appear in the lists of senders and recipients of the fetched messages. For example, if one account name appeared three times, it will be ranked higher than those appeared less than three times. The account name appeared the most times will be ranked the highest. The selected and ranked account names can then be placed in a second group, for example the ranked group. The remaining account names on the communication device, that are neither chosen nor ranked, can be placed in a third group, for example the remaining group. At step 704, the account names in the third group are ranked based on alphabetical order. At step 705, the communication device displays the selected and remaining account names based on the ranking.

Once the account names have been selected and ranked according to the present invention, the user at step 706 can choose another one or a number of account names from the ranked lists. The chosen account names are then placed in the chosen group. By this time, the user is asked if she has found all the account names she wants at step 707. If the user has found all the account names she wants, the selection process ends at stop 708. However, if the user has not found all the account names she wants, the process goes back to step 701. At this time, there is likely to be more than one chosen account names. According to one embodiment of the present invention, when messages are being fetched, only those messages containing all the chosen account names are fetched. For example, if besides Adam, the user has also chosen Jennifer and Peter, then only messages containing all of Adam, Jennifer and Peter as part of the message recipients are selected. Other selection methods can also be used according other embodiments of the present invention. For example, messages containing any one of the chosen account names can be selected. Steps 702 through 707 can be repeated to rank the selected account names. At step 707 the user will be asked again whether she has found all the account names she is looking for or not. If she has found all the account names, the process ends. Otherwise, the previous steps can be performed again.

Other selection and ranking methods can be employed as well. For example, a weighted ranking method can be employed giving account names appearing in more recent messages more weight, or giving account names appearing in sent messages more weight than account names appearing in received messages, or giving account names more weight when they appear in more important messages, or giving account names more weight when they are contacted via phone, instant messenger, social network, micro blog, scheduled meeting, and other communication mechanisms by the user. Since the present invention provides a unified method to achieve multiple modes of communication, contacts occurring over multiple modes of communication can be taken into consideration in the ranking method. The steps described here and show in FIG. 7 could be performed in various orders as long as they achieve the same or similar results. All the different selection and ranking methods can be employed and considered part of the present invention.

According to one embodiment of the present invention, when a sender has multiple user names with different accounts, the communication sub-function can automatically select the proper sender user name according to the recipients. For instance, if recipient A is with service Sa and the sender has a user name Ia with the service Sa, the communication sub-function will deliver the message to recipient A under the sender's user name Ia. If a sender has multiple user names for example Ia and Ib with the same service, the communication sub-function can determine the correct sender user name based on the account information associated with Ia and Ib. For instance, if recipient A is on the contact list of Ia instead of Ib, the communication sub-function will use user name Ia instead of Ib to deliver the message.

When a message is delivered under more than one user name to multiple recipients, the communication sub-function can adapt the content of the message accordingly. The adaptation can be at different levels. For instance, the signatures and the addresses can be modified accordingly to reflect the respective selected user names. The sentence and wording of the message can be modified accordingly as well. Additionally, a picture or other media content of the message can be resized or re-sampled. The adaptations can be made based on the capability of the end service, the communication link, etc. For instance, a message can be adapted to less than a couple hundreds of words if the end service is a Twitter like microblog. As an another example, the size of a picture can be down sampled to 640 by 480 pixels if the end service is Facebook, and keep the original size if the end service is an ordinary email service.

Figure 8:
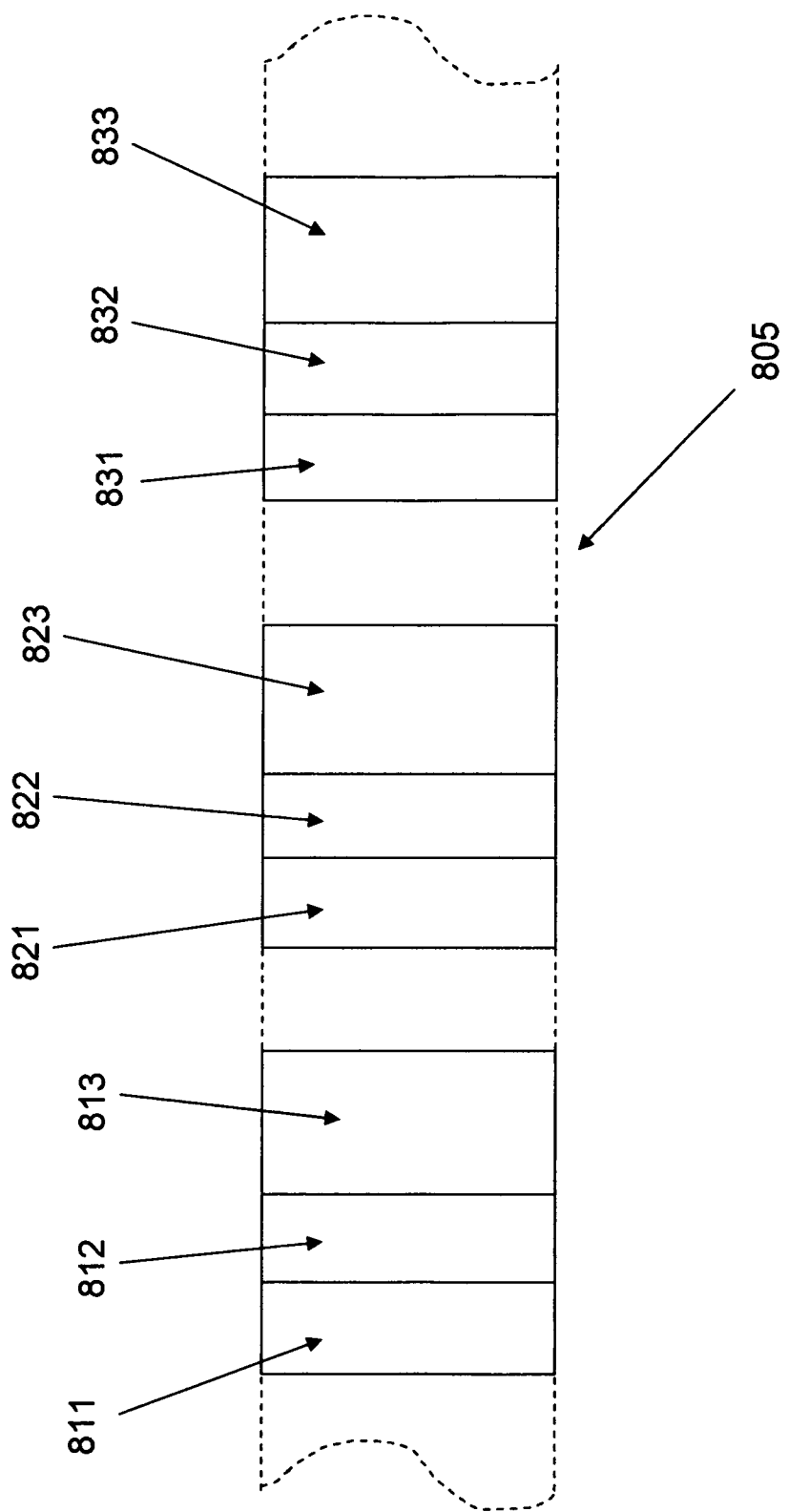
FIG. 8 is a schematic diagram showing an illustrative data file stream according to one embodiment of the invention.

According to one embodiment of the present invention, one of the sub-functions within the overarching application may be a reader sub-function. The reader sub-function can be used to read various digital file formats, for example audio files such as MP3, video files such as MPEG, document files such as PDF, and image files such as JPG. FIG. 8 is a schematic diagram showing an illustrative data file stream according to one embodiment of the invention. According to this embodiment, the reader sub-function breaks the digital file into individual sections. Header segments can be added to each individual section. For example, digital file 805 is divided into at least three sections. Header segments 811 and 812 are followed by content segment 813. Together these three segments form the first section. Header segments 821 and 822 are followed by content segment 823. Together these three segments form the second section. Header segments 831 and 832 are followed by content segment 833. Together these three segments form the third section. Information contains in the content segment is taken from the original digital file, which could be in one of many digital file formats, including the audio, video, document, and image file formats mentioned above. Information contained in the header segment is added by the reader function. There could be one header segment, there could also be multiple header segments. Each header segment could contain a single information string, or multiple information strings. For example, header segments 811, 821, and 831 could contain content owner information. Content owner could be the copyright owner, it could also be the licensee of the particular content. Header segments 812, 822, and 832 contain the sequence information for these three sections. Segment 812 could contain information indicating that this is the first section. Segment 822 could contain information indicating that this is the second section. Segment 832 could contain information indicating that this is the third section. With digital file 805 being divided into multiple sections, and with each individual section containing header segment(s) and content segment(s), digital file 805 can be transmitted to and shared by multiple people remote from each other at the same time without making another copy of the same digital file. Special privilege could be given to the user who is indicated as the content owner in the header segment. For example the sections of the digital file could only be copied or reproduced by the content owner, or the content owner can dictate which of the other users can receive sections of the digital file and which of the other users cannot. Special limitations can be imposed on users who are not identified as the content owner. For example none content owners may be restricted from forwarding sections of the digital file beyond what is permitted by the content owner. Header segment can also contain information indicating the chain of users that a particular section has been forwarded to, so that the path of forwarding can be easily traced.

As an example, if a digital file represents a digital book with multiple pages, the reader sub-function according to the present invention can divide the digital file into multiple sections. The content segment of each of these sections contains the contents of a single page, or a range of pages of the digital book. One header segment of each of the sections contains information indicating the owner of the digital book. Another header segment of each of the sections contains information indicating the page number, or page number range of the digital book contained in the corresponding content segment. After being divided by the reader sub-function according to the present invention, different sections of the digital book can be sent to multiple persons electronically through a communication network, so that multiple persons remote from each other can read the same book at the same time. These persons can exchange their sections after they have finished reading their own sections. All the sections can be returned to the original owner after these persons have finished reading all the sections. No additional copies of the same digital book need to be made. There is always just the same copy of the digital book.

As another example, the digital file could also represent a movie. In this case, the reader sub-function could divide different chapters of a digital movie file into different sections with header segment(s) and content segment(s) in a similar manner as dividing the different pages of a digital book. Similarly, after such division, same movie can be viewed by multiple persons at the same time without making another copy of the same movie. The reader sub-function would exchange the different sections of the digital movie file between the multiple persons so that each person would be watching a particular section of the movie at a certain time. After a first person has finished watching a first section of the movie, the reader sub-function will forward the next section to the first person, and send the first section of the movie file to the next person, so that multiple persons could watch the same movie at different locations remote from each other at the same time without the need to make another copy of the same movie. The reader sub-function can allow the content owner indicated in the header segment to control who can view the sections of the movie. The content owner may also retrieve a list of persons who have viewed the movie from information contained in the header segment when such list is saved in the header segment. Similar methods could be applied to other digital files as well.

According to one embodiment of the present invention, after putting their books or media in the system, owners are not allow to access any section that is currently being used by other users. In another embodiment, a system controls and distributes permissions to access sections of a digital file, instead of controls the distribution of the sections of the digital file. According to this embodiment, the full content of a digital file is distributed through a network to some users who requested the digital file. However, even if the entire digital file is present on the user device, the user is not allowed to access (read, listen, or watch) certain sections of the digital file if there is another user who is accessing (reading, listening, or watching) those sections. The permission to access different sections of the digital file is controlled and distributed by the reader sub-function. The reader sub-function can distribute the permission to access a particular section of a digital file in a way that only one user can access this particular section at any given time.

A significant issue in digital broadcasting/streaming over interne is the noticeable waiting time which reflects the duration between a computing device starts to contact an online media source to request the content, and the requested content is actually delivered to the computing device. The waiting time depends on the capability and the condition of the server holding the content, the computing device, and the network between them.

According to one embodiment of the present invention, the reader sub-function simultaneously connects to multiple online digital media broadcasting/streaming sources and download their contents while the reader sub-function is active before receiving user request. If it is desired to reduce the bandwidth of the data download for cost or other reasons, a low data rate or low quality stream can be employed. The reader sub-function can also simultaneously decodes these multiple streams of digital data that it is downloading. According to this method, the user can start playing anyone of the multiple streams of digital content without the noticeable waiting time. Once the user starts to play a particular stream of digital content, if such digital content is being downloaded through a low data rate or low quality stream, the reader sub-function can start to request a higher data rate and higher quality stream from the online digital media service that provides the content stream.

According to another embodiment of the present invention, the reader sub-function at any given moment may only preload a subset of online digital broadcast sources determined by a set of criteria. The set of criteria can be specified by the end users or the mobile platform. For example, a user can determine a list of digital sources to be preloaded by the reader sub-function. Additionally, the mobile platform can set or adjust the criteria based on the frequency of the sources accessed by the computing devices, and how recent the sources are accessed. For example sources that are accessed more frequently and more recently are priorities to be selected for preloading. The size of the digital file and the quality of the transmission network could also be considered. For example larger files and lower transmission rates could be reasons for preferred preloading. The multiple streams of digital content from online sources can be preloaded at the same rate, or be preloaded at different rates giving preferred sources more system resource for preloading, such as more time and bandwidth. Similar criteria used for selecting online digital sources for preloading could also be used for selecting preferred sources for distributing system download resources.

Other sub-functions within the overarching application could include the shopping sub-function, the gaming sub-function, and the web browsing sub-function. The shopping sub-function could include an online database of merchants and merchandises. A user can either shop individually online or form a group online and shop together at a discount. The shopping sub-function could also show a list of local merchants and merchandises based on the user's location information obtained by the communication device, such as by the GPS component of a smartphone. Payment made for the purchases through the shopping sub-function can be processed with traditional payment methods, such as credit cards. Advertisement may be embedded into the shopping sub-function to show the user merchandise information based on the user's shopping or browsing history. Other sub-functions more frequently used by the user could also be added to the overarching application.

A method for communication with a user using a computing device is presented in this application comprising the steps of presenting a user interface capable of being displayed on a display of the computing device; presenting multiple sub-functions, wherein the multiple sub-functions perform different functions; presenting image representations for the multiple sub-functions; showing at least one of the image representations in the user interface; and presenting a first logic, wherein the first logic controls the activation of the sub-functions and the distribution of system resources of the computing device among the sub-functions. The method above wherein the multiple sub-functions include one of a communication function and reader function, and wherein the user interface comprises a first display area and a second display area, wherein the first display area is used by at least one of the sub-functions activated by the first logic by receiving at least one gesture control signal, and wherein the second display area displays at least one of the image representations for the sub-functions. The method above wherein the user interface comprises a display area, wherein the multiple sub-functions occupy the majority of the display area in a sequence controlled by the first logic and at least one gesture control signal. The method above may further comprise the step of activating two of the multiple sub-functions by the first logic, wherein the two activated sub-functions display images overlapping each other, and wherein a second logic is presented to determine which one of the activated sub-functions should a gesture control signal be applied to.

Systems and devices configured to perform the methods and functions described in this application are also disclosed. The system may contain a server to facilitate communication, wherein the server may contain one or more storage areas to store user data. The server could also contain a processing unit to process some of the logics described in the application. The system may also contain a wired or wireless network, such as interne, cellular network, or WiFi network. The device may contain a processing unit to process some of the logics described in this application. The device may also contain a memory to store user data or software programmed to execute a logic. The device may also contain a display for displaying images and receiving touch control signals, motion sensors for receiving other types of gesture control signals, GPS for receiving location information, and radios for sending and receiving wireless signals.

It is obvious that there are numerous different variations and combinations of the above described embodiments of the invention. All these different variations, combinations and their structural or functional equivalences are considered as part of the invention. The terms used in the specification are illustrative and are not meant to restrict the scope of the invention. The described methods have steps that can be performed in different orders and yet achieve similar results. All the variations in the design components or orders of the method steps are considered as part of this invention as long as they achieve substantially the same results.

The invention is further defined and claimed by the following claims.

We claim:

1. A method for communication with a user using a computing device comprising the steps of:
    causing two images associated with two different applications to be displayed on a display of the computing device, wherein parts of the two images which are different from each other are shown in the same area of the display at the same time
    receiving a gesture control signal, wherein the gesture control signal could be directed to either one of the two images when the gesture control signal is applied;
    presenting a logic to determine which one of the two images the gesture control signal is directed to; and
    executing an instruction from the application associated with the image the gesture control signal is determined to be directed to; and
    further comprising the step of assigning at least one of a relevancy information and a strength indicator to the gesture control signal in connection with one of the two applications, wherein the logic references one of the relevancy information and the strength indicator in its determination.

2. The method of claim 1 further comprising the step of receiving an indication of an area of interest, wherein the logic references at least a portion of the images in the area of interest in its determination.

3. The method of claim 2 further comprising the step of analyzing one of color variation, contrast variation, and border transition of the images in the area of interest.

4. The method of claim 1 further comprising the step of changing an image parameter of at least one of the two images in connection with the determination to make at least one of the two images more prominent.

5. The method of claim 1 further comprising the step of receiving a user input, wherein the logic references the user input in its determination.

6. The method of claim 1 further comprising the step of switching to foreground the application associated with the image the gesture control signal is determined to be directed to.

7. A computing device comprising a display, a memory, and a microprocessor, wherein the microprocessor is capable of executing a software stored in the memory, and the computing device is capable of:
    causing two images associated with two different applications to be displayed on the display, wherein parts of the two images which are different from each other are shown in the same area of the display at the same time;
    receiving a gesture control signal, wherein the gesture control signal could be directed to either one of the two images when the gesture control signal is applied; presenting a logic to determine which one of the two images the gesture control signal is directed to; and
    executing an instruction from the application associated with the image the gesture control signal is determined to be directed to; and
    further capable of assigning at least one of a relevancy information and a strength indicator to the gesture control signal in connection with one of the two applications, wherein the logic references one of the relevancy information and the strength indicator in its determination.

8. The computing device of claim 7 further capable of receiving indication of an area of interest, wherein the logic references at least a portion of the images in the area of interest in its determination.

9. The computing device of claim 7 further capable of changing an image parameter of at least one of the two images in connection with the determination to make at least one of the two images more prominent.

10. The computing device of claim 7 further capable of receiving a user input, wherein the logic references the user input in its determination.

11. The computing device of claim 7 further capable of switching to foreground the application associated with the image the gesture control signal is determined to be directed to.

12. A device comprising means for performing the function of:
    causing two images associated with two different applications to be displayed on a display, wherein parts of the two images which are different from each other are shown in the same area of the display at the same time;
    receiving a gesture control signal, wherein the gesture control signal could be directed to either one of the two images when the gesture control signal is applied;
    presenting a logic to determine which one of the two images the gesture control signal is directed to; and
    executing an instruction from the application associated with the image the gesture control signal is determined to be directed to; and
    further comprising means for performing the function of assigning at least one of a relevancy information and a strength indicator to the gesture control signal in connection with one of the two applications, wherein the logic references one of the relevancy information and the strength indicator in its determination.

13. The device of claim 12 further comprising means for performing the function of receiving indication of an area of interest, wherein the logic references at least a portion of the images in the area of interest in its determination.

14. The device of claim 12 further comprising means for performing the function of changing an image parameter of at least one of the two images in connection with the determination to make at least one of the two images more prominent.

15. The device of claim 12 further comprising means for performing the function of receiving a user input, wherein the logic references the user input in its determination.

16. The device of claim 12 further comprising means for performing the function of switching to foreground the application associated with the image the gesture control signal is determined to be directed to.

* * * * *